(12) United States Patent
Albrecht et al.

(10) Patent No.: US 7,973,484 B2
(45) Date of Patent: Jul. 5, 2011

(54) METHOD AND DEVICE FOR AUTOMATICALLY SWITCHING TO MAIN BEAM

(75) Inventors: Thomas Albrecht, Rottenburg (DE); Eberhard App, Stuttgart (DE); Markus Hess, Baltmannsweiler (DE); Manfred Kuom, Sindelfingen (DE); Markus Neusiedl, Stuttgart (DE); Joerg Russow, Weil der Stadt (DE); Michael Schwarzinger, Sindelfingen (DE); Christoph Steglich, Stuttgart (DE); Bernd Woltermann, Fellbach (DE)

(73) Assignee: Daimler AG, Stuttgart (DE)

( * ) Notice: Subject to any disclaimer, the term of this patent is extended or adjusted under 35 U.S.C. 154(b) by 613 days.

(21) Appl. No.: 12/063,881

(22) PCT Filed: Jul. 28, 2006

(86) PCT No.: PCT/EP2006/007484
§ 371 (c)(1),
(2), (4) Date: May 7, 2008

(87) PCT Pub. No.: WO2007/019954
PCT Pub. Date: Feb. 22, 2007

(65) Prior Publication Data
US 2009/0015164 A1  Jan. 15, 2009

(30) Foreign Application Priority Data
Aug. 17, 2005 (DE) .................. 10 2005 038 805

(51) Int. Cl.
*B60Q 1/02* (2006.01)

(52) U.S. Cl. .................. 315/82; 362/465; 307/10.8

(58) Field of Classification Search .................. 315/77, 315/82; 307/10.1, 10.8; 362/460, 464, 465, 362/466, 469, 467
See application file for complete search history.

(56) References Cited

U.S. PATENT DOCUMENTS

| | | | | | |
|---|---|---|---|---|---|
| 4,236,099 A | * | 11/1980 | Rosenblum | ............... | 315/83 |
| 5,537,003 A | * | 7/1996 | Bechtel et al. | ............... | 315/82 |
| 5,666,028 A | * | 9/1997 | Bechtel et al. | ............... | 315/82 |

(Continued)

FOREIGN PATENT DOCUMENTS

DE   27 28 061 A1   1/1979

(Continued)

OTHER PUBLICATIONS

German Examination Report dated Apr. 28, 2006 including English translation of the relevant portion (Ten (10) pages).

(Continued)

*Primary Examiner* — Thuy Vinh Tran
(74) *Attorney, Agent, or Firm* — Crowell & Moring LLP

(57) ABSTRACT

A main beam switching arrangement for a road vehicle has a lighting device switchable over main beam and dipped headlamps. A sensor device determines at least one ambient parameter, and a control unit with an activatable and deactivatable automatic function automatically switches over the lighting device as a function of the ambient parameter. An operator control unit generates switchover signals by an operator to manually bring about switching over the lighting device with priority. In each case, at least one change of state of the automatic function can be brought about by a first switchover signal for switching on continuous operation of the main beam that is not occurring at the time of signal generation. By way of a second switchover signal, continuous operation of the main beam, which is occurring at the time of signal generation, is switched off.

16 Claims, 2 Drawing Sheets

U.S. PATENT DOCUMENTS

| | | | | |
|---|---|---|---|---|
| 5,909,084 | A * | 6/1999 | Fu et al. | 315/82 |
| 6,238,071 | B1 * | 5/2001 | Fratty | 362/514 |
| 6,281,632 | B1 * | 8/2001 | Stam et al. | 315/82 |
| 6,924,470 | B2 * | 8/2005 | Bechtel et al. | 250/208.1 |
| 7,653,215 | B2 * | 1/2010 | Stam | 382/104 |

FOREIGN PATENT DOCUMENTS

| | | |
|---|---|---|
| DE | 29 08 131 C2 | 9/1980 |
| DE | 41 11 210 A1 | 10/1992 |
| DE | 44 03 937 A1 | 8/1995 |
| DE | 44 36 469 A1 | 9/1995 |
| DE | 295 15 745 U1 | 2/1996 |
| DE | 295 12 958 U1 | 6/1996 |
| DE | 197 30 661 A1 | 5/1998 |
| DE | 196 22 493 C5 | 10/2004 |
| EP | 0 608 453 A1 | 8/1994 |
| EP | 1 008 487 A1 | 6/2000 |
| FR | 1270463 | 8/1961 |
| FR | 2 516 032 A1 | 5/1983 |
| FR | 2 674 201 A1 | 9/1992 |
| WO | WO 97/17227 A1 | 5/1997 |

OTHER PUBLICATIONS

International Search Report dated Oct. 30, 2006 including English translation (Six (6) pages).

* cited by examiner

METHOD AND DEVICE FOR AUTOMATICALLY SWITCHING TO MAIN BEAM

RELATED APPLICATIONS

This application is a U.S. National Phase Entry under 35 U.S.C. §371, of PCT Application PCT/Pub 2006/007484, filed internationally on Jul. 26, 2006, which claims priority to German patent application no. DE 10 2005 038 805.1, filed Aug. 17, 2005. Priority to each of these applications is claimed under 35 U.S.C. §§119 and 120, and the disclosures thereof are hereby incorporated by reference in their entirety.

BACKGROUND AND SUMMARY OF THE INVENTION

The present invention relates to a method for switching to main beam in a road vehicle, in particular a passenger car or truck, wherein the main beam can be switched either automatically in accordance with a sensor device by way of an automatic function with an activated and a deactivated state or manually by operator control actions of an operator, and wherein manual switching of the main beam at least temporarily overrides the automatic function.

Furthermore, the invention relates to a main beam switching for a road vehicle, in particular a passenger car or truck, having a lighting device which can be switched over between main beam and dipped headlamps, a sensor device for determining at least one optical ambient parameter, a control unit with an automatable and deactivatable automatic function for automatically switching over the lighting device as a function of the ambient parameter, and an operator control unit for the generation of switchover signals by an operator. The switchover signals can be used to manually bring about switching over the lighting device with priority.

DE 196 22 493 C5 discloses an automatic main beam switching of the generic type in which a light sensor transmits a control signal (activation signal, deactivation signal) to an assigned electronic unit, in accordance with which the main beam can be switched on and off automatically. The main beam is switched on and off automatically by a steering arm which can be pivoted in the direction of travel or counter to this direction. At the same time, a slight pivoting in the direction of travel corresponds to a headlamp flasher function, while continuous operation is possible by overcoming a pressure point. Subsequent pivoting counter to the direction of travel brings about manual switching off. In this context, it is in particular not possible to discern from the aforesaid document how and with what type of operator control elements the automatic function of the previously known main beam switching can be activated and deactivated, for which a separate additional activation element is generally provided but which reduces the operator control comfort and increases the structural outlay.

DE 197 306 61 A1 describes a semi-automatic main beam switching with a number of light sensors, wherein the main beam control is either carried out completely manually by the driver or automatically by the sensor system. Here, an additional switch is expressly provided for the automatic system which can be switched on and off by manual activation of the switch.

DE 295 12 958 U1 discloses a main beam switching only for automatic dipping of the beam, in which circuit a sensor unit records the light from the headlamps of an oncoming vehicle, in response to which an evaluation unit supplies a signal to a logic unit in which it is logically combined with presettings by the driver of the vehicle and, if appropriate, switches off the main beam. In this context, the manual control overrides the sensor presettings at all times. Switching back to main beam has to be initiated manually.

DE 41 11 210 A1 describes a switch on/switch off automatic system for the lighting system of a motor vehicle using a light sensor, by way of which the dipped headlamps can be switched on at dusk and dipping of the headlamps can be brought about when the main beam is switched on. Further automatic switching functions are not provided. At every automatic switching on and switching off process a warning light lights up in order to indicate to the driver his incorrect behaviour.

DE 44 03 937 A1 discloses an automatic lighting circuit for motor vehicles, in which circuit light sensors are combined with a device for detecting the type of road. The proposed lighting circuit has a first fully automatic operating mode and a second operating mode in which the circuit only indicates a lighting suggestion to the driver. Switching over between the modes is performed manually. This lighting circuit is combined with a conventional lighting controller and can be activated and deactivated by an operator by an additional operator control element.

Finally, automatic lighting control systems of the generic type which can be switched on and off by a menu system are known for motor vehicles. If, in this context, the external lighting of the vehicle is operated in an automatic mode, the presetting of the automatic system, i.e. main beam "on" or "off" can be overridden manually by pulling on a steering arm which is provided for manual switching of the main beam. As a result, the automatic mode is brought about until the lever is pulled again. The exiting from and the re-entry into the automatic mode are indicated as a text message in a menu display. In this system, it is, in particular, considered disadvantageous that the headlamp flasher function (as a rule brief flashing due to corresponding continuous pulling on the steering arm) when the automatic main beam switching is activated is not at all available or is not available in the customary way. Furthermore, the driver cannot directly recognize the instantaneous activation state of the automatic function since only changes of state are indicated by text message.

An object of the foregoing invention is to provide a method and a main beam switching of the type mentioned at the beginning while avoiding the disadvantages specified above to the effect that basically without additional operator control elements it is now possible to implement a fully automatic main beam switching with which manual operator control, in particular the headlamp flasher function (for example by pulling on a steering arm counter to the direction of travel while the main beam itself is switched off) in accordance with expectation is maintained without modification even when the automatic function is activated.

The foregoing object is achieved with a method of the aforementioned type by virtue of the fact that in each case at least one change of state of the automatic function is brought about by a first operator control action for switching on continuous operation of the main beam which is not occurring at the time of the operator control action, and by way of a second operator control action for switching off continuous operation of the main beam which is occurring at the time of the operator control action.

Accordingly, in order to achieve this object in a main beam switching of the aforementioned type, it is proposed that in each case at least one change of state of the automatic function can be brought about by a first switchover signal for switching on continuous operation of the main beam which is not occurring at the time of signal generation, and by way of a second switchover signal for switching off continuous operation of the main beam which is occurring at the time of signal generation.

According to the present invention, the automatic function of the main beam switching is accordingly switched on or off (changes between activated and deactivated state, referred to below for short as state changes) solely by activating devices which are also conventionally used for the manual switching on and off of the main beam. Since, according to the invention, only the two activation processes which are used to switch off the (continuous) main beam when it is switched on and to continuously switch on the main beam when it is switched off, for example pulling or pressing on conventional steering arms with three switched positions, are used for this, the typical headlamp flasher function (switch off movement when the continuous mode of the main beam is switched off) remains unaffected and can continue to be available. This has a highly positive effect on the operator control comfort since the operator control is still in accordance with expectations i.e. the operator, generally the driver of the vehicle, is not confronted with variable operator control processes depending on the state of the automatic function.

According to one currently preferred development of the method according to the invention there is therefore also provision that when the main beam is switched off by the second operator control action independently of the instantaneous state of the automatic function, the switching on of the main beam is restricted to the duration of the operator control action, wherein it can also be provided that the first and second operator control actions are different operator control actions, such as preferably pressing and pulling on a correspondingly embodied device. In this way it is possible to make available a completely conventional headlamp flasher function within the scope of the present invention.

Correspondingly, one preferred development of the main beam switching according to the present invention is characterized by the fact that when the main beam is switched off at the time of generation of the second switchover signal, the second switchover signal can be used, irrespective of an instantaneous state of the automatic function, to switch on the main beam with restriction to the duration of said switchover signal, in the manner of a headlamp flasher.

For the purpose of particularly simple operator control, in a further embodiment of the main beam switching according to the invention, the operator control unit can have a single operator control element for generating the switchover signals. In one variant of the method according to the invention, it is ensured in a comparable way that the operator control actions are performed on a single operator control element. As in conventional, manually activated main beam switchings, the first and second operator control actions may be different operator control actions.

In this context, in the course of specific embodiments of the main beam switching according to the invention, the operator control unit can, as already mentioned, have a switching lever, in particular a steering arm which is known per se, as an operator control element. The switching lever preferably has a monostable neutral position, and a first switched position and a second switched position from which the switching lever jumps back automatically into the neutral position which is advantageously arranged centrally between the first and second switched positions. In this context, by device means it is possible to generate the first switchover signal in the first switched position, such as pivoting of the lever in the direction of travel (pressing), and to generate the second switchover signal in the second switched position, such as pivoting counter to the direction of travel (pulling).

According to an extremely preferred development of the method according to the invention, when the automatic function is activated i.e. automatic system "on", at the time of the operator control action it is additionally possible in each case also to switch on and off the main beam in accordance with the operator control actions. In this way, the manual operator control action overrides the automatic system by virtue of the fact that the main beam is switched on and off immediately on the basis of the operator control action. The main beam therefore can be switched on and off in the automatic mode by the operator at any time if the light conditions or the road conditions so require.

However, in addition a change of state of the automatic function, i.e. automatic system "off" is also brought about according to the invention, as already mentioned above. In a main beam switching according to the invention it is correspondingly possible to provide that when the automatic function is activated at the time of generation of the switchover signal, the switchover signal can, in addition to deactivating the automatic function, also be respectively used to switch over the lighting device. Conversely, within the scope of the present invention there is therefore in particular provision that, in the case of deactivated automatic function, a corresponding operator control action does not also immediately act on the lighting device but rather at first only the automatic function is activated or can be activated (automatic system "on") which then performs the switching on or off of the main beam in accordance with the sensor device.

In order to be able to assess not only the legally required displaying of the switched on main beam but also the more wide ranging state of the main beam switching according to the invention, another development of the main beam switching employs a display device for displaying the activation state of the automatic function in a signal transmitting operative connection to the control unit, by way of which the instantaneous state of the automatic function of the operator is displayed by method means. The display device is advantageously embodied here as an optical display device, for example in the form of a status light (status LED), and can constitute either a separate unit or be combined with the above-mentioned main beam display. The display device preferably displays the (activation) state of the automatic function continuously.

Alternatively or additionally, the operator can be informed by the combination instrument about the state of the automatic function, for example by a text message or corresponding symbol, in which case color codings can be used as an aid.

In order to increase road safety, the automatic function is advantageously activated on a standard basis, i.e. they are set before the first operator control action performed by the operator on the operator control elements provided, after the vehicle lighting system has been operated, possibly automatically, in such a way that firstly automatic turning on of the main beam occurs in corresponding light conditions and traffic conditions.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
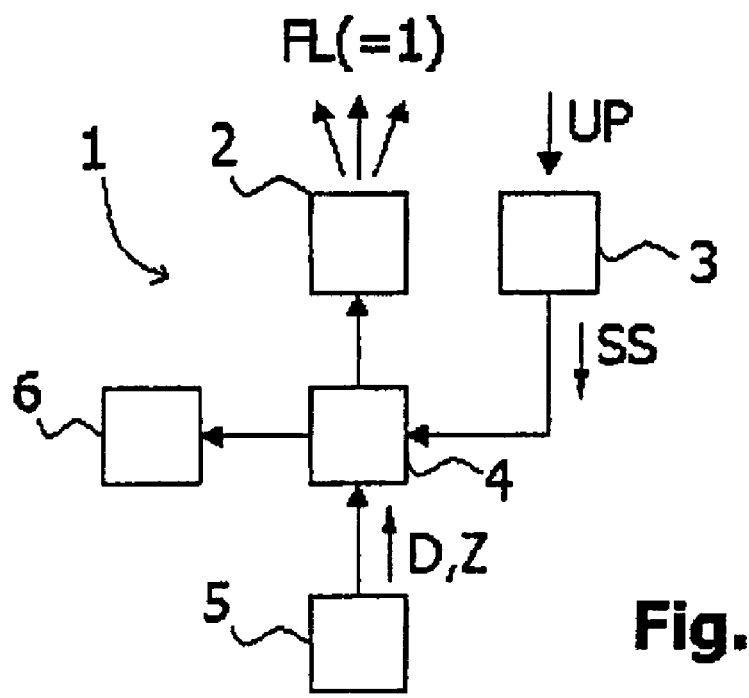
FIG. 1 is a schematic block diagram of a main beam switching arranged according to the invention.

FIG. 1 is a schematic view of a main beam switching arrangement 1 according to the invention, as is used in a road vehicle (not shown), in particular a passenger car (PKW) or a truck (LKW) or the like. The main beam switching arrangement 1 firstly has a lighting device 2 that can be switched over between main beam FL and dipped headlamps, such as a number of headlamps which are respectively equipped with corresponding light sources. A state with the switched-on main beam, FL=1, is illustrated by way of example in FIG. 1.

Furthermore, the main beam switching arrangement 1 has a sensor device 3 that serves to determine at least one ambient parameter UP which is symbolized by an arrow pointing to the sensor device 3. The lighting device 2 and the sensor device 3 have a signal transmitting operative connection to an electronic control unit 4 which is illustrated in FIG. 1 by corresponding connecting arrows. The control unit 4 has an operator control display logic (to be explained in more detail below with reference to FIG. 3, with an automatic function AF that can be activated and deactivated (see below), and is configured, on the one hand, when the automatic function is activated, i.e. AF=1 to switch over the lighting device 2 automatically between the switched states FL=0, main beam switched off, and FL=1, main beam switched on, as a function of the ambient parameter UP or a sensor signal SS, derived therefrom, of the sensor device 3.

The ambient parameter or parameters determined by the sensor 3 are preferably optical parameters such as, for example, the ambient brightness. The optical ambient parameters can appropriately be used alongside, or else replaced by, non-optical parameters such as, for example, navigation data, radio signals relating to the infrastructure, for example, radio marking of entries into localities or exits therefrom, entries into tunnels and exits therefrom.

In addition, the main beam switching 1 also has an operator control unit 5 that is also connected in a signal transmitting manner to the control unit 4. The operator control unit 5 is operative for generating switchover signals D, Z (see below) by an operator (not shown). The signals can be used to manually bring about the switching over of the lighting device 2 and/or the activation/deactivation of the automatic function AF, also referred to below for short as "automatic system", by way of the control unit 4 with priority. Finally, the main beam switching 1 according to the invention also has a display device 6 for displaying the activation state of the automatic function, specifically AF=1 (automatic system "on" i.e. the main beam FL is switched on and off in accordance with the sensor device 3) or AF=0 (automatic system "off", i.e. the main beam FL is switched on and off manually by the operator using the operator control unit 5). The display device 6 also has a signal transmitting operative connection to the control unit 4. In this way, the operator receives information as to whether the automatic system is switched on or off at a particular time.

Figure 2:
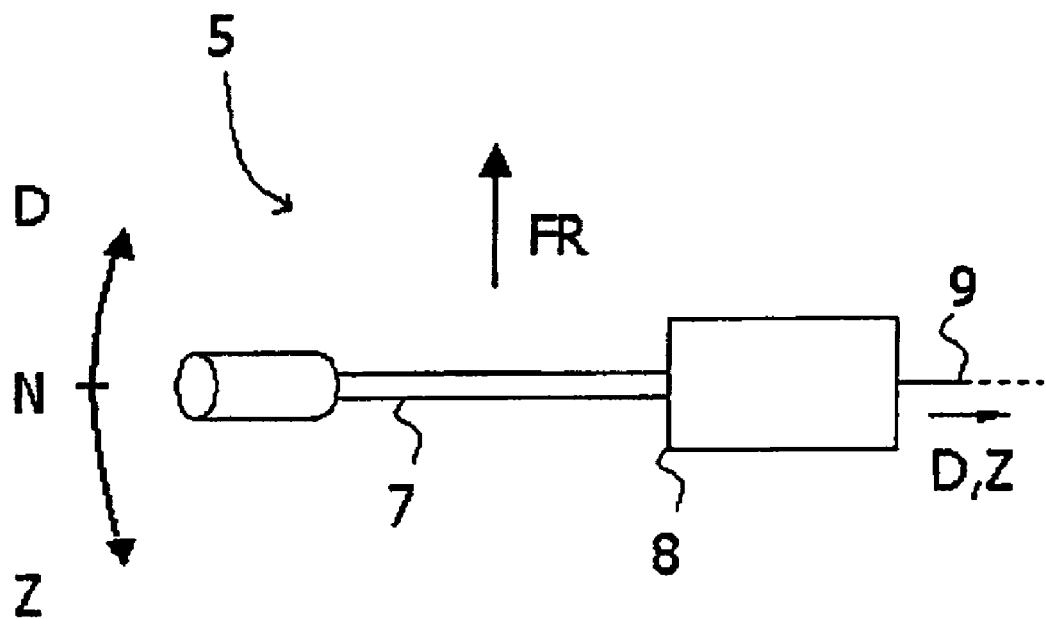
FIG. 2 shows a preferred embodiment of an operator control element of the main beam switching according to FIG. 1.

FIG. 2 illustrates the operator control unit 5 of the main beam switching arrangement 1 according to FIG. 1 in a more detailed plan view. The operator control unit has a single operator control element 7 which is embodied in a manner known per se as a steering arm. The latter interacts with a switching unit 8 via whose signal output 9 corresponding operator control signals in the form of switchover signals D, Z can be supplied to the control unit 4 (FIG. 1). The operator control element 7, and therefore the switching unit 8, have three switched positions N, D, Z which are each assigned a corresponding (switchover) signal of the switching unit 8, and thus of the entire operator control unit 5. For reasons of clarity, these signals are provided below with the same reference symbols as the assigned positions N, D, Z of the steering arm. The latter is embodied in the exemplary embodiment shown as a constable switching lever which, after activation in one of the three directions of the double arrow in FIG. 2, jumps back automatically into the central neutral position N in which the switching unit 8 does not generate a switchover signal. On the other hand, switchover signals are generated if the operator pivots the operator control element 7 in the forward direction FR of travel of the road vehicle or pivots it counter to this direction ("pushes", D or "pulls", Z).

In a conventional manual main beam switchover operation, the corresponding switchover signals D and Z are usually employed to switch the main beam FL on and off continuously (expressed symbolically: FL=0–D→FL=1 and FL=1–Z→FL=0). In addition, pulling Z when the main beam is switched off (FL=0) implements a headlamp flasher function, i.e. the main beam remains switched on (FL=1) only for as long as the operator control element 7 is held in the Z position by the operator.

Figure 3:
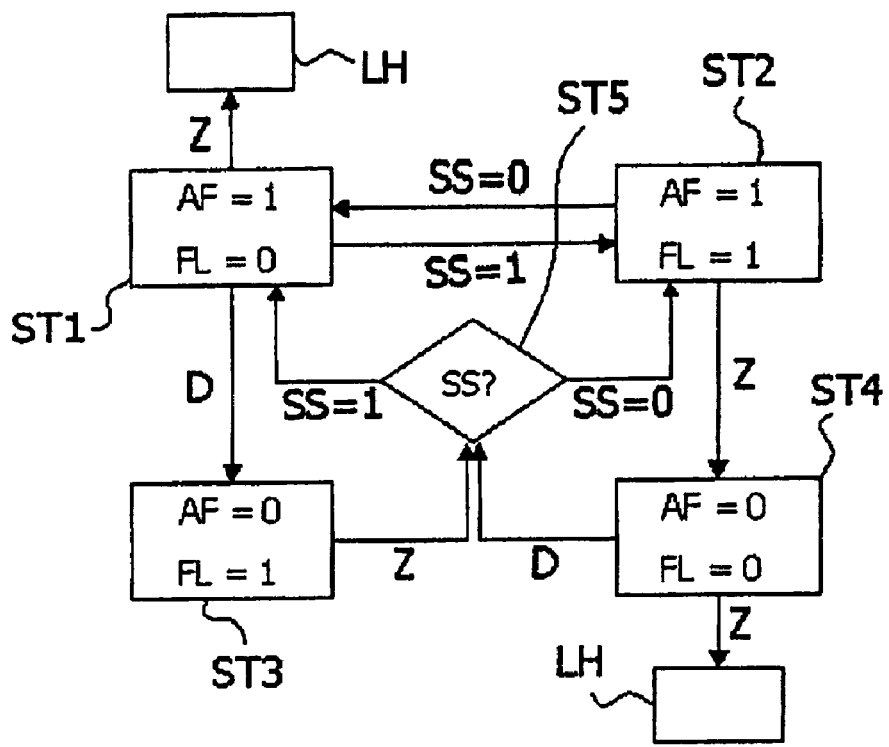
FIG. 3 is a flowchart/state diagram illustrating (operator control) sequences in a method according to the invention.

An operator control sequence which can be implemented by the main beam switching 1 according to the invention (FIG. 1) as shown in FIG. 3 in which the respective states of the automatic system ("on": AF=1, "off": AF=0) and of the main beam ("on": FL=1, "off": FL=0) are represented as a function of switchover signals D, Z which are initiated by an operator and sensor signals SS of the sensor device 3 (FIG. 1). These states ST1-ST4 also represent logic control states of the suitably embodied electronic control unit 4 (FIG. 1) which has a corresponding operator control and display logic. In this context, the term "SS=1" means that the sensor device has determined the ambient parameter UP (FIG. 1) in such a way that it supplies a sensor signal SS for the, if appropriate, automatic switching on of the headlamp (FL=1). Conversely, "SS=0" means that the main beam FL is switched off (FL=0).

According to the default setting when the exterior lighting of the vehicle is activated, the main beam switching is, on a standard basis, in a state ST1 or ST2 in which the automatic system is respectively activated (AF=1). The main beam FL is then switched by the control unit 4, cf. FIG. 1, in accordance with the sensor device 3. In the state ST1, the main beam FL is switched off (FL=0), while in the state ST2 it is switched on (FL=1). The properties of each state are displayed to the operator, cf. FIG. 4. Changing between the states ST1 and ST2 is possible only in accordance with the sensor signal SS, in which case the state is changed from ST1 to ST2 if SS=1. For SS=0, the state jumps from ST2 to ST1.

According to the present invention, the operator is able at any time to override the active automatic system (AF=1) by corresponding operator control actions performed on the operator control element 7 of the operator control unit 5 (FIG. 2). This is done by virtue of the fact that in each case at least one state change of the automatic function (AF=0↔AF=1) is brought about by a first operator control action D for switching on continuous operation of the main beam, i.e. FL=0, which is not occurring at the time of the operator control action, and alternatively by a second operator control action Z for switching off continuous operation of the main beam, i.e. FL=1, which is occurring at the time of the operator control action.

According to FIG. 3, the main beam control system accordingly changes from the state ST1 into a state ST3 where AF=0, FL=1 under the influence of the switchover signal D. It is therefore possible for the operator to switch on the main beam continuously as is customary by pressing on the steering arm (FIG. 2) manually even when the automatic system is active. At the same time, this deactivates the automatic system. Correspondingly, the switchover signal Z brings about, as is customary, manual dipping of the headlamps (FL=0) from the state ST2, but in this case according to the present invention the automatic system is also switched off (AF=0). This corresponds to a state ST4.

A return to the states ST1, ST2 with the automatic system active (AF=1) occurs according to FIG. 3 from the state ST3 (FL=1) by pulling Z and from the state ST4 (FL=0) by pushing D. This corresponds in each case to the operator control operation which would conventionally be necessary to switch the main beam off and on manually. However, according to the invention such switchover signals Z and D do not directly bring about manual switching over of the lighting device 2 (FIG. 1) from the states ST3 and ST4 but rather at first only activation of the automatic system (AF=1), and in the case of reference symbol ST5 they bring about interrogation of the sensor device 3 (FIG. 1) or evaluation, by the control unit 4, of the sensor signal SS which is obtained in this way (FIG. 1). The result of this interrogation ST5 determines whether the main beam switching according to the invention returns to the state ST1 (SS=0 ⇒FL=0) or the state ST2 (SS=1 ⇒FL=1).

Moreover, in the states ST1 and ST4, i.e. when the main beam (FL=0) is switched off, a headlamp flasher function LH is available, as in the case of conventional manual switching over, irrespective of the activation state of the automatic system. The headlamp flasher function LH is respectively capable of being activated by pulling Z without the automatic system being influenced here.

In contrast, according to the embodiment shown here, activating by pressing D the operator control element 7 (FIG. 2) does not have any effect whatsoever, as is also customary from manual switching over, when the main beam is switched on (FL=1) in the states ST2 and ST3.

In this way, according to the invention, an automatic main beam switching operation is available which also permits operation of the main beam by the operator according to expectations.

Figure 4:
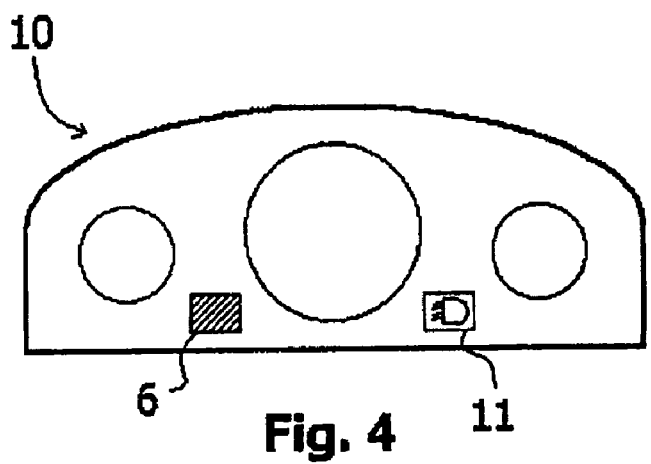
FIG. 4 shows a display device which is used in a main beam switching according to the invention.

In order to inform the operator about the current activation state of the main beam automatic system, the invention provides, in addition to the legally prescribed displaying of the switched on main beam, a standby state display for the automatic mode. This is illustrated in FIG. 4 which is a schematic view of a typical combination instrument 10 of a passenger car into which different instruments such as speedometer or rotational speed meter can be integrated, as is known to a person skilled in the art and thus does not need to be explained here in further detail. In particular, the combination instrument 10 has a first display device 11 which indicates when the main beam is switched on, for example by lighting up in blue. In addition, the combination instrument according to FIG. 4 also has a second display device 6 (cf. FIG. 1) which is connected to the control unit 4 or a display logic which is contained therein and indicates whether the automatic system is switched on or off. This can be done, for example, by virtue of the fact that an LED (not shown) which is contained in the display device 6 or an alternative lighting apparatus in the case of AF=1 is made to light up in accordance with the control unit 4. Alternatively, the display devices 6, 11 can also be configured in a combined form as a single display device.

If it has previously been assumed that the automatic function is basically in the standby state and is only selected or deselected as a function of the respective operator control action of the switching lever 7, for the description of a further preferred embodiment the basic standby state of the automatic function is to be capable of being optionally activated or deactivated by the operator using a separate operator control element.

Figure 5:
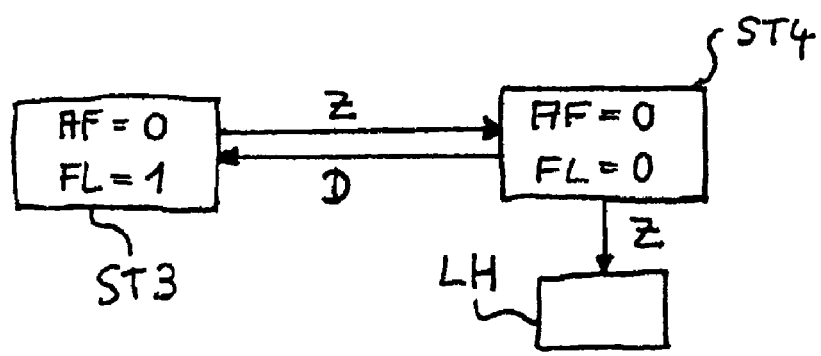
FIG. 5 is a state diagram corresponding to the lower part of FIG. 3.

This second element has the advantage that when the automatic standby state is switched off entirely by the separate operator control element, the operator control lever 7 functions entirely as a conventional main beam switching means, as illustrated in FIG. 5. The operator can then herself determine to what extent she wishes, or does not wish, to use the automatic function.

FIG. 5 corresponds, in terms of states ST3 and ST4, to the lower part of FIG. 3; the states ST1 and ST2 can no longer be reached owing to the switched off standby state of the automatic function. In the switched off state of the main beam switching apparatus ST4, the switching apparatus is placed in the switched on state ST3 by pressing D on the operator control element 7, and the headlamp flasher LH is triggered by pulling Z. In the switched on state of the main beam switching means ST3, the switching apparatus is placed in the switched off state ST4 by pulling Z on the operator control element.

If the standby state of the automatic function is activated again by the separate operator control element, the main beam switching means operates again in conjunction with the operator control element 7 according to the principle illustrated in FIG. 3.

The separate operator control element may be an existing light spindle switch into which an additional stage is integrated for switching the standby state of the main beam automatic function on and off so that with this switch it is possible to switch, for example, 4 stages:

1st stage—parking lights
    2nd stage—dipped headlamps
    3rd stage—automatic dipped headlamps
    4th stage—standby state for automatic main beam The 4the stage can be of non-latching arrangement here so that the toggle with which such rotary switches are usually provided jumps back to the position 3 after activation.

For indicating the status as to whether the main beam automatic system is in the standby state or not, a light emitting diode can be provided in the light spindle switch.

Instead of a 4the stage of the light spindle switch the standby state of the main beam automatic system can alternatively also be connected to the setting of the automatic dipped headlamps, that is to say to the 3rd stage. A further alternative for specifying or deselecting the standby state of the main beam automatic system is to carry out corresponding settings by way of, for example, menu-controlled operation of the combination instrument.

The invention claimed is:

1. A method for switching to main beam in a road vehicle, comprising:
    switching the main beam either automatically in accordance with a sensor device via an automatic function with an activated and a deactivated state or manually by operator control actions, and, with manual switching of the main beam, at least temporarily overriding the automatic function, wherein
    in each case at least one change of state of the automatic function is brought about by a first operator control action for switching on continuous operation of the main beam not present before the time of the first operator control action, and by a second operator control action for switching off continuous operation of the main beam present before the time of the second operator control action, and the activation state of the automatic function is displayed by a display that is in a signal-transmitting operative connection to a control element.

2. The method as claimed in claim 1, wherein in each case the main beam is also switched on or off in accordance with the operator control actions when the automatic function is activated at the time of the operator control actions.

3. The method as claimed in claim 1, wherein when the main beam is switched off by the second operator control action the switching on of the main beam is restricted to the duration of the operator control action independently of the instantaneous state of the automatic function.

4. The method as claimed in claim 1, wherein the first and second operator control actions are performed on a single operator control element.

5. The method as claimed in claim 1, wherein the automatic function is switchable off to a standby state or entirely by an operator control element.

6. A main beam switching arrangement for a road vehicle, comprising:
- a lighting device switchable between main beam and dipped headlamps,
- a sensor device configured to determine at least one ambient parameter,
- a control unit with an activatable and deactivatable automatic function for automatically switching over the lighting device as a function of the at least one ambient parameter,
- an operator control unit configured to generate switchover signals by an operator for manually bringing about switching over the lighting device with priority, and
- a display device to display the activation state of the automatic function, the display device being in a signal-transmitting operative connection to the operator control unit, wherein
- in each case at least one change of state of the automatic function is brought about by a first switchover signal for switching on continuous operation of the main beam not present before the time of the first switchover signal, and by a second switchover signal for switching off continuous operation of the main beam present before the time of the second switchover signal.

7. The main beam switching arrangement as claimed in claim 6, wherein when the automatic function is already activated at the time of generation of the switchover signal, the switchover signal can also be respectively used to switch over the lighting device.

8. The main beam switching arrangement as claimed in claim 6, wherein, when the main beam is switched off at the time of generation of the second switchover signal, the second switchover signal can be used, irrespective of an instantaneous state of the automatic function, to switch on the main beam with restriction to the duration of said switchover signal.

9. The main beam switching arrangement as claimed in claim 6, wherein the automatic function is activated when an exterior lighting of the road vehicle is activated.

10. The main beam switching arrangement as claimed in claim 6, wherein the operator control unit has a single operator control element configured to generate the first and second switchover signals.

11. The main beam switching arrangement as claimed in claim 6, wherein the operator control unit has a switching lever as an operator control.

12. The main beam switching arrangement as claimed in claim 11, wherein the switching lever is comprised of a steering arm.

13. The main beam switching arrangement as claimed in claim 11, wherein the switching lever has a monostable neutral position, a first switched position and a second switched position.

14. The main beam switching arrangement as claimed in claim 13, wherein the switching lever generates the first switchover signal in the first switched position and generates the second switchover signal in the second switched position.

15. The main beam switching arrangement as claimed in claim 6, wherein the automatic function is switchable by an operator control element that is separate from the switching lever.

16. The main beam switching arrangement as claimed in claim 15, wherein the separate operator control element that is separate from the switching lever is an existing light spindle switch or a menu-controlled user interface.

\* \* \* \* \*